United States Patent
Schmid

(10) Patent No.: US 12,151,556 B2
(45) Date of Patent: Nov. 26, 2024

(54) VEHICLE HAVING AN ADJUSTABLE DISPLAY SCREEN

(71) Applicant: Bayerische Motoren Werke Aktiengesellschaft, Munich (DE)

(72) Inventor: Bernhard Schmid, Hallbergmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 622 days.

(21) Appl. No.: 17/423,679

(22) PCT Filed: Jan. 28, 2020

(86) PCT No.: PCT/EP2020/051991
§ 371 (c)(1),
(2) Date: Jul. 16, 2021

(87) PCT Pub. No.: WO2020/160958
PCT Pub. Date: Aug. 13, 2020

(65) Prior Publication Data
US 2022/0089025 A1    Mar. 24, 2022

(30) Foreign Application Priority Data
Feb. 6, 2019   (DE) ..................... 10 2019 102 943.0

(51) Int. Cl.
*B60K 35/00* (2024.01)
*B60K 35/10* (2024.01)
(Continued)

(52) U.S. Cl.
CPC .............. *B60K 35/00* (2013.01); *B60K 35/10* (2024.01); *B60K 35/22* (2024.01); *B60K 35/29* (2024.01);
(Continued)

(58) Field of Classification Search
CPC ........ B60K 35/00; B60K 35/10; B60K 35/22; B60K 35/29; B60K 35/53; B60K 35/223;
(Continued)

(56) References Cited

U.S. PATENT DOCUMENTS 8,485,666 B2 *   7/2013   Cho ..................... G03B 21/62
                                                            348/837
2010/0302019 A1   12/2010  Birkemeyer et al.
(Continued)

FOREIGN PATENT DOCUMENTS

CN   103873843 A   6/2014
CN   205836692 U   12/2016
(Continued)

OTHER PUBLICATIONS

Machine translation of DE102015214761a1 (Year: 2017).*
(Continued)

*Primary Examiner* — Christopher E Leiby
(74) *Attorney, Agent, or Firm* — Crowell & Moring LLP

(57) ABSTRACT

A vehicle has a display screen designed to be moved between an observation position and a reflection position. The display screen has a display screen surface, wherein, when in the observation position, the display screen surface can be directly observed by a user of the vehicle from a user position of the vehicle. The vehicle has a reflecting surface, wherein, in the reflection position, the display screen surface faces the reflecting surface such that an image displayed on the display screen surface generates a mirror image on the reflecting surface, which mirror image is visible to a user of the vehicle from the user position of the vehicle.

13 Claims, 2 Drawing Sheets

(51) Int. Cl.
*B60K 35/22* (2024.01)
*B60K 35/29* (2024.01)
*B60K 35/53* (2024.01)

(52) U.S. Cl.
CPC ...... *B60K 35/53* (2024.01); *B60K 2360/1438* (2024.01); *B60K 2360/195* (2024.01); *B60K 2360/23* (2024.01); *B60K 2360/31* (2024.01)

(58) Field of Classification Search
CPC ...... B60K 2360/1438; B60K 2360/195; B60K 2360/23; B60K 2360/31; B60K 2360/344; B60R 11/0235
See application file for complete search history.

(56) References Cited

U.S. PATENT DOCUMENTS

| | | | |
|---|---|---|---|
| 2011/0001932 A1 | 1/2011 | Zuehlsdorff | |
| 2014/0168608 A1 | 6/2014 | Disley | |
| 2014/0333647 A1 | 11/2014 | Lee | |
| 2015/0009100 A1* | 1/2015 | Haneda | B60R 1/00 345/7 |
| 2015/0165906 A1 | 6/2015 | Lee | |
| 2018/0070388 A1* | 3/2018 | Maxwell | G06F 13/00 |
| 2020/0066236 A1* | 2/2020 | Giusti | G06V 10/143 |

FOREIGN PATENT DOCUMENTS

| | | | | |
|---|---|---|---|---|
| CN | 106296868 A | | 1/2017 | |
| CN | 207067652 U | | 3/2018 | |
| DE | 10 2007 046 971 A1 | | 4/2009 | |
| DE | 10 2007 053 422 A1 | | 5/2009 | |
| DE | 10 2012 222 900 A1 | | 6/2014 | |
| DE | 102015214761 A1 | * | 2/2017 | |
| DE | 10 2016 007 348 A1 | | 12/2017 | |
| EP | 1 783 531 A1 | | 5/2007 | |
| JP | 63-168128 U | | 11/1988 | |
| JP | 5-18948 U | | 3/1993 | |
| JP | 11-30764 A | | 2/1999 | |
| JP | 2016-53622 A | | 4/2016 | |
| JP | 2017-109577 A | | 6/2017 | |
| KR | 10-2013-0051194 A | | 5/2013 | |
| WO | WO-2014049787 A1 | * | 4/2014 | ......... G02B 27/0093 |

OTHER PUBLICATIONS

International Search Report (PCT/ISA/210) issued in PCT Application No. PCT/EP2020/051991 dated Apr. 21, 2020 with English translation (five (5) pages).
German-language Written Opinion (PCT/ISA/237) issued in PCT Application No. PCT/EP2020/051991 dated Apr. 21, 2020 (five (5) pages).
German-language Search Report issued in German Application No. 10 2019 102 943.0 dated Oct. 10, 2019 with partial English translation (12 pages).
Japanese-language Office Action issued in Japanese Application No. 2021-545376 dated Jun. 28, 2023 with English translation (7 pages).
Japanese-language Office Action issued in Japanese Application No. 2021-545376 dated Nov. 8, 2023 with English translation (8 pages).
Chinese-language Office Action issued in Chinese Application No. 202080007815.6 dated Nov. 22, 2023 with English translation (18 pages).

* cited by examiner

VEHICLE HAVING AN ADJUSTABLE DISPLAY SCREEN

BACKGROUND AND SUMMARY OF THE INVENTION

The invention relates to a vehicle having a display screen, which can be adjusted differently for different usage scenarios.

A vehicle, in particular a motor vehicle, typically has at least one display screen, which is arranged, for example, in the center console and/or on the dashboard of the vehicle. The display screen can be part of an infotainment system of the vehicle and can be used, for example, as part of a user interface and/or as a navigation device. Because of the restricted installation space in a vehicle and for reasons of design and cost, the display screen of a vehicle is usually relatively small, so that the display screen can only be used to a limited extent in particular for playing back films.

The present document relates to the technical problem of providing a vehicle having a compact display screen which can be used in an efficient and flexible manner for different applications.

The object is achieved by the independent claim. Advantageous embodiments are described, inter alia, in the dependent claims. It is to be noted that additional features of a claim dependent on an independent claim can form a separate invention independent of the combination of all features of the independent claim, without the features of the independent claim or only in combination with a subset of the features of the independent claim, which can be made the subject matter of an independent claim, a divisional application, or a subsequent application. This applies in the same way to the technical teachings described in the description which can form an invention independent of the features of the independent claims.

According to one aspect, a vehicle, in particular a (road) motor vehicle (such as a passenger vehicle or a truck or a bus or a motorcycle) is described. The vehicle comprises a display screen, which is designed to be moved between an observation position and a reflection position. The display screen can be rotatably mounted, for example, on an axis, in order to move the display screen between the observation position and the reflection position. The axis can extend (at least partially) transversely to the travel direction and/or transversely to the longitudinal axis of the vehicle.

The display screen has a display screen surface. The display screen surface can have a plurality of pixels, wherein the pixels are arranged, for example, in a matrix of pixels. For example, the display screen surface can have N lines and M columns having pixels. N and M can each be 100 or more, 500 or more, 1000 or more, or 2000 or more. The individual pixels can be individually activated to emit light in order to reproduce an image on the display screen surface which can be observed by a user of the vehicle.

The display screen is arranged in such a way that the display screen surface can be observed directly by a user of the vehicle originating from a user position (for example originating from the driver position) of the vehicle in the observation position. The display screen can thus be used in the observation position for the direct reproduction or display of image information. The display screen surface can possibly be touch-sensitive, so that the display screen surface can be touched by the user for user inputs when the display screen is in the observation position.

The vehicle has a reflective surface. The reflective surface can be part of the dashboard and/or the instrument panel of the vehicle. The reflective surface can face toward one or more user positions of the vehicle.

The display screen is designed in such a way that the display screen surface faces toward the reflective surface in the reflection position, so that an image displayed on the display screen surface generates a mirror image on the reflective surface which is visible to a user of the vehicle originating from the user position of the vehicle. The display screen can thus be used in the reflection position as a projector to generate a mirror image for the reproduction of visual information. An efficient use of a single display screen for multiple applications is thus enabled.

As already described above, the display screen surface of the display screen faces toward the user position of the vehicle in the observation position. On the other hand, the display screen surface can face away from the user position in the reflection position, or at least can no longer face toward the user position. In particular, the display screen can be arranged in the reflection position in such a way that the display screen surface cannot be observed or viewed directly from the user position of the vehicle. It can thus be ensured that the user can always only see one image (either directly on the display screen surface (when the display screen is in the observation position) or on the reflective surface (when the display screen is in the reflection position)).

The reflective surface can be arranged relative to the display screen surface and/or can be shaped in such a way that the mirror image is larger than the display screen surface, in particular by a factor of 1.5 or more, 2 or more, or 3 or more. Alternatively or additionally, the display screen and the reflective surface can be designed to generate a mirror image magnified by a factor q in relation to the display screen surface, which enables a distortion-free reproduction of image information. The factor q is preferably 1.5 or more, 2 or more, or 3 or more. A magnified reproduction of image information can thus be enabled via the projected mirror image. This can advantageously be used, for example, for playing back films (for example during autonomous driving of the vehicle).

The vehicle can comprise a control unit, which is configured to determine whether the display screen is in the observation position or in the reflection position. The image reproduction on the display screen surface of the display screen can take place in dependence on whether the display screen is in the observation position or in the reflection position. In particular, the visual reproduction on the display screen surface can be corrected if the display screen is in the reflection position, for example, to enable a distortion-free image reproduction of the mirror image on the reflective surface in an efficient manner.

The control unit can be configured to change an image to be displayed on the display screen surface as a function of distortion data, so that the image on the reflective surface is visible for a user as a distortion-free mirror image (in particular when it is determined that the display screen is in the reflection position). The distortion data can be dependent on the shape of the reflective surface and/or on the orientation of the reflective surface relative to the display screen surface. A distortion-free visual reproduction of the mirror image can thus be enabled in an efficient manner by image processing.

The reflective surface can be deformable. In particular, the reflective surface can have a first shape when the display screen is in the observation position and can have a second shape when the display screen is in the reflection position, wherein the first shape and the second shape are different. The first shape can be optimized, for example, for the (manual) driving mode of the vehicle (for example to provide a user interface adapted for the driving mode of the vehicle). On the other hand, the second shape can be optimized for the reproduction of the mirror image (for example to provide the largest possible mirror image). The comfort can thus be further enhanced for a user of the vehicle.

The vehicle can be designed to (automatically) deform the reflective surface while the display screen is moved from the observation position into the reflection position and/or from the reflection position into the observation position. The different applications of the display screen can thus be provided in a convenient manner.

The vehicle can comprise an electrically operated actuator (for example an electric motor), which is configured to move the display screen from the observation position into the reflection position and/or from the reflection position into the observation position. The actuator can be activated, for example, in reaction to a user input. The different applications of the display screen can be provided in a comfortable manner by the use of an electrically operated actuator.

As already described above, the display screen can have a touch-sensitive display screen surface (for example a touchscreen). The vehicle can be configured to detect user inputs for controlling a function of the vehicle only by touching the display screen surface when the display screen is in the observation position. Alternatively or additionally, the vehicle can be configured to ignore user inputs for controlling a function of the vehicle by touching the display screen surface when the display screen is in the reflection position. The reliability of a user interface of the vehicle provided via the display screen can thus be enhanced.

The display screen can be arranged in the vehicle in such a way that the display screen surface of the display screen can be observed and/or touched during manual driving of the vehicle by a driver of the vehicle when the display screen is in the observation position. Alternatively or additionally, the reflective surface can be arranged and/or designed in such a way that the mirror image can be seen from multiple user positions of the vehicle when the display screen is in the reflection position. Different applications can thus be provided by a single display screen in a comfortable manner in a vehicle.

It is to be noted that the devices and systems described in this document can be used both alone and also in combination with other devices and systems described in this document. Furthermore, any aspects of the devices and systems described in this document can be combined with one another in manifold ways. In particular, the features of the claims can be combined with one another in manifold ways.

The invention is described in greater detail hereinafter on the basis of exemplary embodiments.

DETAILED DESCRIPTION OF THE DRAWINGS

Figure 1:
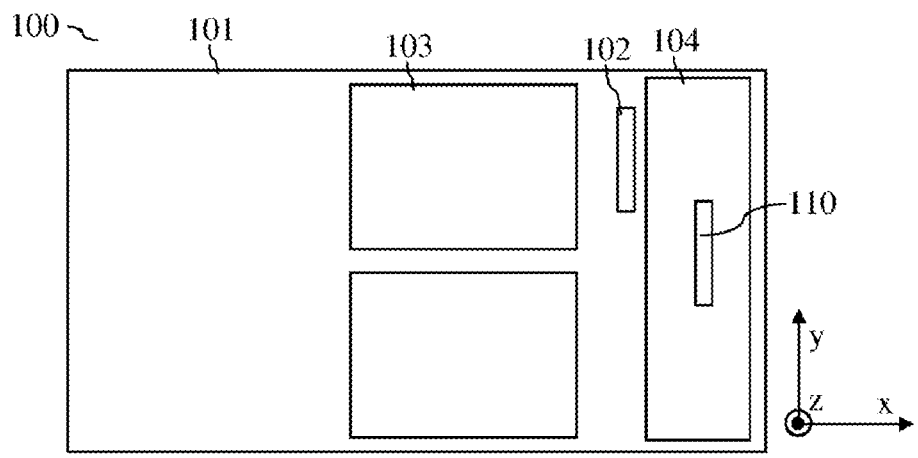
FIG. 1 shows the interior of an exemplary vehicle.

As described at the outset, the present document relates to providing a compact display screen in a vehicle, which can be used for different applications. In this context, FIG. 1 shows exemplary components of a vehicle 100. The vehicle 100 comprises, for example, one or more occupant or user positions 103 (for example in the form of seats), for example in an interior or in an occupant cabin 101. Furthermore, the vehicle 100 can have a dashboard 104 and a steering device 102 (such as a steering wheel) in the front region of the interior 101. A driver of the vehicle 100 can be arranged at the occupant position 103 and can control the vehicle 100 at least partially manually via the steering device 102.

Furthermore, the vehicle 100 has a display screen 110, which is arranged, for example, on the dashboard 104 of the vehicle 100. The display screen 110 can be permanently installed in the vehicle 100, and can be used, for example, as part of a user interface and/or a navigation system of the vehicle 100. The display screen is usually relatively small for reasons of cost and design, and is therefore typically not capable of playing back a video, which can be observed from different occupant positions 103 of the vehicle 100.

Figure 2A:
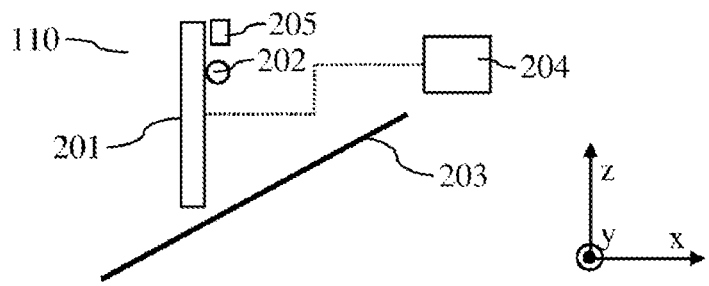
FIGS. 2a to 2c show an exemplary display screen for a vehicle.
Figure 2B:
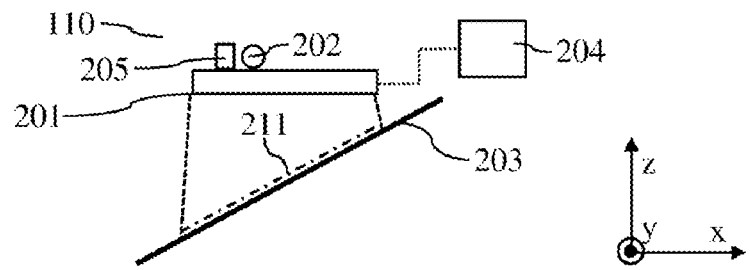
Figure 2C:
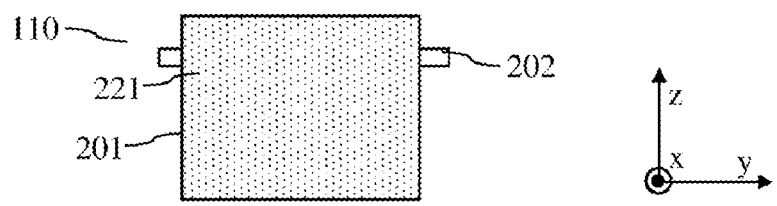

FIGS. 2a to 2c show an exemplary display screen 110 for the vehicle 100, which can be moved into different positions or settings for different applications. The display screen 110 is rotatably or pivotably mounted around an axis 202, so that the display screen 110 can be moved back and forth between an observation position (see FIG. 2a) and a reflection position (see FIG. 2b). As shown by the coordinate systems in FIGS. 1 and 2a to 2c, the axis 202 can extend along the y axis or along the transverse axis of the vehicle 100. The z axis typically corresponds to the vertical axis of the vehicle 100 and the x axis typically corresponds to the longitudinal axis of the vehicle 100.

In the observation position, the display screen 110 is arranged in the vehicle 100 in such a way that the display screen surface 201 of the display screen 110 can be directly observed by a user of the vehicle 100 originating from an occupant position 103 of the vehicle 100. The display screen surface 201 can extend, for example, essentially perpendicularly to the x axis of the vehicle 100 when the display screen 110 is in the observation position. In particular, the pixels 221 shown on the display screen surface 201 can be seen directly by the user in the observation position. Furthermore, touching of the display screen surface 201 by a user arranged at an occupant position 103 of the vehicle 100 can be enabled in the observation position upon use of a touch-sensitive display screen 110.

In the reflection position, the display screen surface 201 of the display screen 110 is typically not visible to a user of the vehicle 100. The display screen surface 201 faces toward a reflective surface 203 of the vehicle 100 in the reflection position, so that an image displayed on the display screen surface 201 is reflected on the reflective surface 203, and is visible as a mirror image 211 for a user of the vehicle 100 arranged at an occupant position 103 of the vehicle 100. The reflective surface 203 can be, for example, part of the dashboard 104 of the vehicle 100. In the reflection position, the display screen surface 201 of the display screen 110 can be arranged essentially perpendicular to the z axis of the vehicle 100.

The reflective surface 203 can be designed and/or arranged in such a way that the mirror image 211 is a magnified version of an image displayed on the display screen surface 201 of the display screen 110. In particular, the reflective surface 203 can be arranged obliquely in relation to the display screen surface 201 of the display screen 110 for this purpose. Alternatively or additionally, the reflective surface 203 can have a magnifying curvature.

A display 110 mounted movably in space and/or rotatably around a transverse axis 202 is thus described. In a first setting (i.e., in the observation position), information can be displayed on the display screen surface 201 of the display 110, which can be seen directly by a user. The size of the display visible to the user corresponds to the size of the display screen surface 201. In the first setting, touch operation via a touch-sensitive display screen surface 201 can also be enabled.

Furthermore, the display 110 can be moved into a second setting (i.e., into the reflection position), so that an image displayed on the display screen surface 201 is reflected on a reflective surface 203. A mirror image 211 magnified by a specific factor q is thus generated, wherein the factor q is dependent on the orientation and/or the curvature of the reflective surface 203. The second position can be used, for example, to play back a video which can be observed from multiple occupant positions 103 of the vehicle 100. In the second setting, user inputs can be enabled, for example, via remote touch, speech, and/or gestures.

The reflective surface 203 of the vehicle 100 can be made flexible and/or bending. In particular, the reflective surface 203 can be deformed by a mechanism when the display screen 110 is moved from the observation position into the reflection position. In other words, the reflective surface 203 (for example as part of the instrument panel or the dashboard 104 of the vehicle 100) can be designed in such a way that the reflective surface 203 bends flexibly and/or continuously during rotation of the monitor or display screen 110, in order to enable the rotation of the monitor 110. In still other words, the reflective surface 203 can have a different shape in the observation position than in the reflection position. In particular, the shape of the reflective surface 203 in the observation position can be optimized for the driving mode of the vehicle 100. On the other hand, the shape of the reflective surface 203 in the reflection position can be optimized for the display of a magnified and distortion-free mirror image 211. The provision of an adjustable display screen 110 can thus be further improved.

The vehicle 100 can have an actuator 205, for example an electric motor, which is configured to move the display screen 110 automatically back and forth between the observation position and the reflection position. Furthermore, the vehicle 100 can comprise at least one operating element (not shown), which can be actuated by a user of the vehicle 100 to cause the display screen 110 to be moved from the observation position into the reflection position and/or from the reflection position into the observation position. The comfort can thus be further enhanced for a user of the vehicle 100.

Furthermore, the vehicle 100 can comprise a control unit 204, which is configured to determine whether the display screen 110 is in the observation position or in the reflection position. The display screen 110 can be operated in dependence on whether the display screen 110 is in the observation position or in the reflection position. For example, user input via the touch-sensitive display screen surface 201 can possibly only be enabled if the display screen 110 is in the observation position. Otherwise, touches of the display screen surface 201 can be ignored if the display screen 110 is in the reflection position. The reliability of a user interface of the vehicle 100 provided via the display screen 110 can thus be enhanced.

Alternatively or additionally, the images displayed on the display screen surface 201 can be output in dependence on whether the display screen 110 is in the observation position or in the reflection position. In particular, an image can possibly be output in a distorted manner on the display screen surface 201 if the display screen 110 is in the reflection position in order to at least partially compensate for distortions which are caused by the orientation and/or the shape of the reflective surface 203. For example, distortion data, which are dependent on the orientation and/or the shape of the reflective surface 203, can be taken into consideration by the control unit 204. The distortion data can indicate a transformation between an image which is displayed on the display screen surface 201 and the mirror image 211. The control unit 204 can apply the transformation inverse thereto to an image to be displayed on the display screen surface 201 in order to cause the mirror image 211 to reproduce the image to be displayed without distortion. The reproduction of distortion-free mirror images 211 on a reflective surface 203 can thus be enabled efficiently by the consideration of distortion data.

An adjustable display screen 110 is thus described which, in an observation position, enables the provision of a user interface with high resolution for the manual driving mode. Furthermore, the display screen 110 can be used in a reflection position as a relatively large virtual monitor (for example if the vehicle 100 is in an autonomous driving mode). The comfort for a user of a vehicle 100 can thus be enhanced efficiently.

The present invention is not restricted to the exemplary embodiments shown. In particular, it is to be noted that the description and the figures are only to illustrate the principle of the proposed devices and systems.

What is claimed is:

1. A vehicle, comprising:
   a reflective surface of the vehicle;
   a display screen, wherein
      the display screen is designed to be moved between an observation position and a reflection position,
      the display screen has a display screen surface,
      the display screen surface is observable directly by a user of the vehicle originating from a user position of the vehicle in the observation position, and
      the display screen surface faces toward the reflective surface in the reflection position, so that an image displayed on the display screen surface generates a mirror image on the reflective surface, which is visible to a user of the vehicle originating from the user position of the vehicle; and
   a control unit of the vehicle, the control unit being configured to:
      determine whether the display screen is in the observation position or in the reflection position, and
      when the display screen is determined to be in the reflection position, change an image to be displayed on the display screen surface as a function of distortion data so that the image on the reflective surface is visible to a user as a distortion-free mirror image, wherein the distortion data are dependent on a shape of the reflective surface and/or on an orientation of the reflective surface relative to the display screen surface, wherein:
   the reflective surface is deformable,
   the reflective surface has a first shape when the display screen is in the observation position, and has a second shape when the display screen is in the reflection position, and
   the first shape and the second shape are different.

2. The vehicle according to claim 1, wherein
   the reflective surface is arranged in relation to the display screen surface and/or is shaped such that the mirror image is larger than the display screen surface.

3. The vehicle according to claim 2, wherein
   the mirror image is larger by a factor of 1.5 or more.

4. The vehicle according to claim 3, wherein
   the mirror image is larger by a factor of 3 or more.

5. The vehicle according to claim 1, wherein
the display screen and the reflective surface are designed to generate a mirror image enlarged by a factor q in relation to the display screen surface, which enables a distortion-free reproduction of image information, and the factor q is 1.5 or more.

6. The vehicle according to claim 1, wherein
the display screen and the reflective surface are designed to generate a mirror image enlarged by a factor q in relation to the display screen surface, which enables a distortion-free reproduction of image information, and the factor q is 3 or more.

7. The vehicle according to claim 1, wherein
the reflective surface is part of a dashboard and/or an instrument panel of the vehicle.

8. The vehicle according to claim 1, wherein
the display screen is rotatably mounted around an axis in order to move the display screen between the observation position and the reflection position.

9. The vehicle according to claim 8, wherein
the axis extends transversely to a travel direction and/or to a longitudinal axis of the vehicle.

10. The vehicle according to claim 1, wherein
the vehicle is designed to deform the reflective surface while the display screen is moved from the observation position into the reflection position and/or from the reflection position into the observation position.

11. The vehicle according to claim 1, further comprising:
an electrically operated actuator which is configured to move the display screen from the observation position into the reflection position and/or from the reflection position into the observation position.

12. The vehicle according to claim 1, wherein
the display screen has a touch-sensitive display screen surface,
the vehicle is configured to detect user inputs to control a function of the vehicle by touching the display screen surface only when the display screen is in the observation position; and/or
the vehicle is configured to ignore user inputs to control a function of the vehicle by touching the display screen surface when the display screen is in the reflection position.

13. The vehicle according to claim 1, wherein
the display screen is arranged such that the display screen surface of the display screen is observable and/or touched by a driver of the vehicle during manual driving of the vehicle when the display screen is in the observation position; and/or
the reflective surface is arranged and/or designed such that the mirror image is viewable from multiple user positions of the vehicle when the display screen is in the reflection position.

* * * * *